United States Patent [19]

Panchak et al.

[11] Patent Number: 4,761,433

[45] Date of Patent: Aug. 2, 1988

[54] USE OF ANTIMONY COMPOUNDS TO RETARD CATALYST DEACTIVATION IN FOAM-FORMING COMPOSITIONS CONTAINING AROMATIC POLYESTER POLYOLS

[75] Inventors: John R. Panchak, Wilmington, Del.; John M. Trowell, St. Simons Island, Ga.

[73] Assignee: Hercules Incorporated, Wilmington, Del.

[21] Appl. No.: 128,853

[22] Filed: Dec. 4, 1987

[51] Int. Cl.$^4$ ............................................. C08J 9/14
[52] U.S. Cl. ...................................... 521/124; 521/112; 521/129; 521/131
[58] Field of Search ...................... 521/124, 112, 129

[56] References Cited

U.S. PATENT DOCUMENTS

| | | | |
|---|---|---|---|
| 3,412,066 | 11/1968 | Schnegg et al. | 260/47 |
| 3,796,691 | 3/1974 | Chimura et al. | 260/75 |
| 4,085,283 | 4/1978 | Den Otter et al. | 523/451 |
| 4,140,660 | 2/1979 | Den Otter et al. | 524/720 |
| 4,225,453 | 9/1980 | Du Pont et al. | 252/182 |
| 4,289,896 | 9/1981 | Buxbaum | 560/92 |

*Primary Examiner*—Morton Foelak
*Attorney, Agent, or Firm*—Joanne W. Patterson

[57] ABSTRACT

Organic antimony compounds can be used to retard deactivation of urethane catalysts during storage of a B side formulation containing aromatic polyester polyols, used in the manufacture of rigid polyurethane foams.

8 Claims, No Drawings

USE OF ANTIMONY COMPOUNDS TO RETARD CATALYST DEACTIVATION IN FOAM-FORMING COMPOSITIONS CONTAINING AROMATIC POLYESTER POLYOLS

FIELD OF THE INVENTION

This invention relates to formulations containing aromatic polyester polyols for use in the manufacture of rigid polyurethane foams. This invention especially relates to the use of organic antimony compounds to stabilize such formulations against catalyst deactivation.

BACKGROUND OF THE INVENTION

Rigid polyurethane (PUR) foams are made by mixing two components, the "A" component and the "B" component, also known in the art as the "A side" and the "B side". In the manufacture of polyurethane foams, the A side contains the isocyanate and the B side is a mixture of at least one polyol, a catalyst for the formation of urethane linkages, a surfactant and a blowing agent. The catalyst in the B side is gradually deactivated when the formulation is stored for an extended period of time, probably by reaction with small amounts of organic and inorganic acids that are present in the formulation. Producers of foams require that their B side formulations be stable against catalyst deactivation for at least six months at ambient temperature.

SUMMARY OF THE INVENTION

It has now been found that organic antimony compounds can be used to retard deactivation of urethane catalysts during storage of a B side formulation containing an aromatic polyester polyol, used in the manufacture of rigid polyurethane foams.

The composition of this invention for admixture with an isocyanate to form a rigid polyurethane foam comprises (a) an aromatic polyester polyol, (b) a surfactant, (c) a tertiary amine catalyst, (d) an organic blowing agent and (e) an organic antimony compound that is soluble in the polyol.

DETAILED DESCRIPTION OF THE INVENTION

The aromatic polyester polyol used in the composition of this invention contains at least two hydroxyl groups. The polyol is prepared by esterifying an aromatic polycarboxylic acid-containing material with a polyhydric alcohol, typically diethylene glycol. The aromatic carboxylic acid-containing material can be, for example, depolymerized scrap polyethylene terephthalate, e.g., from fiber, bottles or film; phthalic acid or phthalic anhydride; or dimethyl terephthalate (DMT) process residue. Such aromatic polyester polyols are available commercially. Examples include TERATE® 203 aromatic polyester polyol (Hercules Incorporated), CHARDOL™ 570 aromatic polyester polyol (Chardonol Corp.) and STEPANOL™ PS-3152 aromatic polyester polyol (Stepan Chemical Co.).

The aromatic polyester polyol that is derived from DMT process residue is prepared by reacting DMT process residue with an excess of a glycol or mixture of glycols such as, for example, ethylene glycol; 1,2- and 1,3-propanediol; 1,3- or 1,4-butanediol; neopentyl glycol; hexanediol; diethylene glycol and dipropylene glycol. The preparation of such a product is described in U.S. Pat. No. 4,346,229, the disclosure of which is incorporated herein by reference. Aromatic polyester polyols that are the reaction product of DMT process residue and diethylene glycol are preferred.

The residue from the manufacture of dimethyl terephthalate is a tar-like, solid material composed of a highly complex mixture of high molecular weight monomeric and polymeric constituents, included among which are the methyl and benzyl esters of biphenyl and triphenyl dicarboxylic and tricarboxylic acids. The residue at 25° C. has the following typical ranges of properties:

| Color | Dark Brown |
| --- | --- |
| Drop Softening Point[1] | 10–140° C. |
| Acid Number (ASTM D1639, neutral chloroform solvent) | 10–110 |
| Methoxyl in COOCH$_3$ (ASTM D-1166-60) | 7–30% by weight |
| DMT | 0–20% by weight |
| Saponification Number[2] | 375–500 |

[1]Hercules drop softening point method as described on page 12 of a booklet entitled "Wood Rosins, Modified Rosins and Related Resins", published in 1963 by Hercules Powder Company, now by change of name Hercules Incorporated.
[2]Anal. Chem. 23, 1126 (1951).

The surfactant employed in the composition of this invention can be of the silicone oil type such as polysiloxane-polyoxyalkylene block copolymers or polydimethyl siloxane; or the type obtained by polymerization of dibutyl maleate monomer and an N-vinyl pyrrolidone monomer compound.

Any of the known tertiary amine catalysts used in the preparation of rigid cellular polyurethanes or combinations of these catalysts can be employed in the composition of this invention. Examples of these catalysts include triethylenediamine, dimethylethanolamine, dimethylcyclohexylamine, triethylamine, N-methylmorpholine, N-ethylmorpholine, dimethylpiperazine, and tetramethylpropanediamine.

Any of the usual blowing agents generally employed in making PUR foam formulations can be used, preferably those of the halohydrocarbon type, e.g., trichloromonofluoromethane, sold under the trademark FREON® 11 (Du Pont).

The stabilizer can be any organic antimony compound that is soluble in the aromatic polyester polyol. Such compounds include, but are not limited to, antimony 2-ethyl hexanoate, antimony tris(2-ethyl hexanoate), antimony triacetate and antimony tris(ethylene glycoxide). Antimony 2-ethyl hexanoate is the preferred stabilizer. The antimony compound is added to the aromatic polyester polyol before mixing with the other components of the B side formulation and is present in an amount of 100–1000 ppm, based on the weight of the polyol. An amount of 200–500 ppm is preferred, most preferably about 300 ppm.

The stabilized formulations of this invention can be used in rigid polyurethane foam applications such as rigid urethane spray, pour-in-place rigid urethane bunstock, pour-in-place appliance rigid urethane foams, and urethane laminate foamboard. The laminated boards are used as building panels and can comprise a single facing sheet having the foam thereon, or a facing sheet on either side of the foam. Examples of suitable facing sheet materials include, among others, kraft paper, aluminum, fiber glass and asphalt-impregnated felts, as well as laminates of two or more of these materials. In "pour-in-place" applications, the liquid foam-forming formulation is poured into a cavity where it foams, fills the cavity, and hardens and cures in place.

The following examples are illustrative of this invention and are not intended to limit its scope in any way.

EXAMPLE 1

The components of the urethane foam-forming formulation that is used in Examples 1 through 5 are given below. The B side is prepared in the laboratory by weighing all ingredients into a container and blending them together at ambient temperature using a high-speed mixer. After the B side is prepared, the isocyanate is weighed into the vessel containing the B side and the mixture is stirred for 5 seconds. The mixture is then poured into a mold where it reacts to form the foam.

| | Parts by Weight |
|---|---|
| B Side: | |
| Aromatic polyester polyol (1) | 100.0 |
| Surfactant (2) | 1.5 |
| Catalyst (3) | 1.0 |
| Blowing agent (4) | 15.0 |
| A Side: | |
| Polyisocyanate (5) | 82.3 |

(1) TERATE ® 203 aromatic polyester polyol (Hercules Incorporated)
(2) DC-193 silicone-polyoxyalkylene copolymer (Dow Corning)
(3) Dimethylethanolamine
(4) Trichlorofluoromethane
(5) PAPI-27 polymethylene polyphenylisocyanate (Dow Chemical Co.)

The catalytic activity of a control B side formulation containing the aromatic polyester polyol and the other constituents listed above (no stabilizer) is determined by measuring the cream time, gel time, tack-free time and rise time of a foam prepared from the formulation. The results are given in Table 1. The gel time is considered to be the most important indicator of catalytic activity.

TERATE ® 203 typically has a hydroxyl number of 320, an acid number of 2.9, a viscosity at 25° C. of 18,000 cps and a maximum free diethylene glycol content of 11%.

The parameters used to measure catalytic activity are defined as follows.

Cream Time

Cream time or initiation time is the time interval between mixing of the ingredients and the visible start of the foaming reaction. The reaction begins when the mixture turns a creamy color or when the foam just begins to rise.

Gel Time

Gel time is the time interval between the mixing of the ingredients and the time when the polymer foam acquires a stable three dimensional structure.

Tack-Free Time

Tack-free time is the time interval between mixing the ingredients and the time when the surface of the foam does not feel tacky to the hand or does not adhere to a wooden tongue depressor.

Rise Time

Rise time is the interval between the mixing of the ingredients and the time when the foam stops rising in an open container.

The amounts of antimony 2-ethyl hexanoate that are indicated in Table 1 are added to 100 parts TERATE ® 203 aromatic polyester polyol and mixed for 10 minutes to ensure uniform dispersion of the stabilizer in the polyol. The polyol/stabilizer dispersions are mixed with the other constituents of the B side formulation listed above. The catalytic activity of the B side formulation is measured as described for the control. The results are given in Table 1.

The stabilized B side formulations, together with the control, are then subjected to an accelerated aging process in which the samples are held at 49° C. in an oven. Two weeks of accelerated aging at 49° C. is considered to be equal to three months aging at room temperature. After 7 days, samples of the aged B side formulations are removed from the oven and cooled to room temperature. The cooled formulations are then placed in a constant temperature bath held at 20° C. The A side is also placed in the constant temperature bath. When both components have reached temperature equilibrium, typically within 2-3 hours, they are mixed together to form a foam and measurements are made of the cream time, gel time, tack-free time and rise time. The same procedure is repeated after 14 days accelerated aging. The results are given in Table 1.

TABLE 1

| Control | Initial | 7 Days at 49° C. | 14 Days at 49° C. |
|---|---|---|---|
| Cream time, sec | 21 | 26 | 36 |
| Gel time, sec | 52 | 64 | 73 |
| Tack-free time, sec | 61 | 73 | 80 |
| Rise time, sec | 93 | 55 | 111 |
| 100 ppm Antimony | | | |
| Cream time, sec | 25 | 28 | 26 |
| Gel time, sec | 49 | 55 | 57 |
| Tack-free time, sec | 58 | 62 | 64 |
| Rise time, sec | 83 | 87 | 103 |
| 200 ppm Antimony | | | |
| Cream time, sec | 24 | 22 | 25 |
| Gel time, sec | 44 | 48 | 52 |
| Tack-free time, sec | 50 | 52 | 56 |
| Rise time, sec | 73 | 80 | 87 |
| 300 ppm Antimony | | | |
| Cream time, sec | 22 | 19 | 25 |
| Gel time, sec | 40 | 42 | 45 |
| Tack-free time, sec | 44 | 45 | 49 |
| Rise time, sec | 65 | 71 | 84 |
| 400 ppm Antimony | | | |
| Cream time, sec | 21 | 20 | 19 |
| Gel time, sec | 37 | 39 | 41 |
| Tack-free time, sec | 40 | 43 | 45 |
| Rise time, sec | 66 | 66 | 73 |
| 500 ppm Antimony | | | |
| Cream time, sec | 19 | 20 | 22 |
| Gel time, sec | 33 | 36 | 37 |
| Tack-free time, sec | 37 | 40 | 42 |
| Rise time, sec | 56 | 58 | 67 |

EXAMPLE 2

A stabilized B side formulation is prepared having the same components as in Example 1, except that antimony triacetate is used as the stabilizer. The catalytic activity of the formulation is measured as described in Example 1. The formulation is then subjected to accelerated aging and the catalytic activity measured as described in Example 1. The results of the measurements of the catalytic activity are given in Table 2. The control is the same as in Example 1.

EXAMPLE 3

A stabilized B side formulation is prepared having the same components as in Example 1, except that antimony trisethylene glycoxide is used as the stabilizer. The catalytic activity of the formulation is measured as described in Example 1. The formulation is then subjected to accelerated aging and the catalytic activity measured as described in Example 1. The results of the measurements of the catalytic activity are given in Table 2. The control is the same as in Example 1.

TABLE 2

|  | Initial | 7 Days at 49° C. | 14 Days at 49° C. |
| --- | --- | --- | --- |
| (Ex. 2) |  |  |  |
| 300 ppm Antimony |  |  |  |
| Cream time, sec | 24 | 26 | 24 |
| Gel time, sec | 40 | 44 | 45 |
| Tack-free time, sec | 49 | 50 | 54 |
| Rise time, sec | 68 | 78 | 79 |
| (Ex. 3) |  |  |  |
| 300 ppm Antimony |  |  |  |
| Cream time, sec | 23 | 25 | 23 |
| Gel time, sec | 41 | 45 | 45 |
| Tack-free time, sec | 49 | 52 | 53 |
| Rise time, sec | 72 | 77 | 74 |

EXAMPLE 4

A stabilized B side formulation is prepared having the same components as in Example 1, except that antimony tris(2-ethyl hexanoate) is used as the stabilizer. The catalytic activity of the formulation is measured as described in Example 1. The formulation is then subjected to accelerated aging and the catalytic activity measured as described in Example 1. The results of the measurements of catalytic activity are given in Table 3.

TABLE 3

| Control | Initial | 7 Days at 49° C. | 14 Days at 49° C. |
| --- | --- | --- | --- |
| Cream time, sec | 27 | 28 | 30 |
| Gel time, sec | 53 | 62 | 66 |
| Tack-free time, sec | 68 | 75 | 79 |
| Rise time, sec | 92 | 98 | 109 |
| 300 ppm Antimony |  |  |  |
| Cream time, sec | 21 | 23 | 25 |
| Gel time, sec | 41 | 42 | 44 |
| Tack-free time, sec | 48 | 53 | 53 |
| Rise time, sec | 69 | 72 | 73 |

EXAMPLE 5

A stabilized B side formulation is prepared having the same components as in Example 1, except that the polyol is TERATE® 423 aromatic polyester polyol (Hercules Incorporated) and antimony tris(2-ethyl hexanoate) is used as the stabilizer. The catalytic activity of the formulation is measured as described in Example 1. TERATE® 423 has the following typical properties: hydroxyl number, 320; viscosity, cps @ 25° C., 4000; and water content, 0.2%. The formulation is then subjected to accelerated aging and the catalytic activity measured as described in Example 1. The results of the measurements of catalytic activity are shown in Table 4.

TABLE 4

| Control | Initial | 7 Days at 49° C. | 14 Days at 49° C. |
| --- | --- | --- | --- |
| Cream time, sec | 26 | 28 | 26 |
| Gel time, sec | 57 | 68 | 68 |
| Tack-free time, sec | 67 | 81 | 87 |
| Rise time, sec | 102 | 115 | 128 |
| 300 ppm Antimony |  |  |  |
| Cream time, sec | 19 | 17 | 19 |
| Gel time, sec | 36 | 41 | 43 |
| Tack-free time, sec | 43 | 50 | 49 |
| Rise time, sec | 70 | 72 | 82 |
| 400 ppm Antimony |  |  |  |
| Cream time, sec | 17 | 18 | 18 |
| Gel time, sec | 34 | 38 | 38 |
| Tack-free time, sec | 40 | 46 | 44 |
| Rise time, sec | 61 | 70 | 70 |
| 500 ppm Antimony |  |  |  |
| Cream time, sec | 13 | 14 | 17 |
| Gel time, sec | 32 | 35 | 35 |
| Tack-free time, sec | 37 | 41 | 40 |
| Rise time, sec | 60 | 65 | 64 |
| 600 ppm Antimony |  |  |  |
| Cream time, sec | 11 | 13 | 13 |
| Gel time, sec | 29 | 32 | 31 |
| Tack-free time, sec | 35 | 40 | 37 |
| Rise time, sec | 59 | 61 | 57 |

What I claim and desire to protect by Letters Patent is:

1. A composition for admixture with an isocyanate to form a rigid polyurethane foam, said composition comprising
   (a) an aromatic polyester polyol,
   (b) a surfactant,
   (c) a tertiary amine catalyst,
   (d) an organic blowing agent, and
   (e) an organic antimony compound that is soluble in the polyol.

2. The composition of claim 1 wherein the amine is dimethylethanolamine.

3. The composition of claim 1 wherein the antimony compound is antimony 2-ethyl hexanoate.

4. The composition of claim 1 wherein the polyol is the reaction product of DMT process residue and diethylene glycol.

5. In a process for preparing a rigid polyurethane foam, said process comprising mixing an isocyanate with a composition comprising
   (a) an aromatic polyester polyol
   (b) a surfactant
   (c) a tertiary amine catalyst and
   (d) an organic blowing agent,
the improvement comprising mixing said composition with an organic antimony compound that is soluble in the polyol.

6. The process of claim 5 wherein the amine is dimethylethanolamine.

7. The process of claim 5 wherein the antimony compound is antimony 2-ethyl hexanoate.

8. The process of claim 5 wherein the polyol is the reaction product of DMT process residue and diethylene glycol.

* * * * *